United States Patent

[11] 3,622,708

[72] Inventors John H. Guenther
Rochester;
Klaus Gueldenpfennig, Penfield, both of N.Y.

[21] Appl. No. 40,254
[22] Filed May 25, 1970
[45] Patented Nov. 23, 1971
[73] Assignee Stromberg-Carlson Corporation
Rochester, N.Y.

[54] CONFERENCE CIRCUIT
14 Claims, 9 Drawing Figs.

[52] U.S. Cl. .......... 179/18 BC
[51] Int. Cl. .......... H04m 3/56
[50] Field of Search .......... 179/18 BC

[56] References Cited

UNITED STATES PATENTS 3,506,790 4/1970 Ozenberger .......... 179/27 CA
3,544,726 12/1970 Wimberly .......... 179/18 BC

*Primary Examiner*—William C. Cooper
*Attorney*—Charles C. Krawczyk

ABSTRACT: A plurality of junctor circuits having four wire ports are adapted to be connected by a switching matrix to any of a plurality of conference bridges. The switching matrix includes an impedance balance circuit so that the load applied to the conference bridge remains substantially constant regardless of the number of junctor circuits connected to any one conference bridge. Each junctor circuit includes a sidetone suppression circuit for its return signal received from a connected conference bridge. A stacking circuit is also connected to the switching matrix so that the various separate conference connections can be readily interconnected into common conference connections and later disconnected keeping the separate conference connections intact.

JOHN H. GUENTHER
KLAUS GUELDENPFENNIG
INVENTORS

BY Charles C. Krawczyk

ATTORNEY

JOHN H. GUENTHER
KLAUS GUELDENPFENNIG
INVENTORS

BY Charles C. Krawczyk

ATTORNEY

JOHN H. GUENTHER
KLAUS GUELDENPFENNIG
INVENTORS

BY Charles C. Krawczyk

ATTORNEY

JOHN H. GUENTHER
KLAUS GUELDENPFENNIG
INVENTORS

BY Charles C. Krawczyk

ATTORNEY

JOHN H. GUENTHER
KLAUS GUELDENPFENNIG
INVENTORS

BY Charles C. Krawczyk

ATTORNEY

JOHN H. GUENTHER
KLAUS GUELDENPFENNIG
INVENTORS

BY Charles C. Krawczyk

ATTORNEY

JOHN H. GUENTHER
KLAUS GUELDENPFENNIG
INVENTORS

BY Charles C. Krawczyk

ATTORNEY

CONFERENCE CIRCUIT

BACKGROUND OF THE INVENTION

This invention relates to telephone conference circuits in general, and more particularly to a conference circuit capable of interconnecting a large number of telephone subscribers.

Recent developments and improvements of telephone switching systems have led to an ever increasing demand by the telephone subscriber for more convenient and flexible telephone service. For example, there is an ever increasing demand for telephone systems having the capability of providing larger, more reliable, and more flexible conference circuits that exhibit good transmission characteristics. In the past, small conference arrangements merely included circuits for directly interconnecting the tip and ring lines of the conferees. A system of this sort is sufficient for conference calls that include three to five local subscribers. However, such conference circuits are not acceptable for greater conference requirements without seriously degrading the transmission capabilities of the telephone connections. Such conference circuits are also not readily adaptable for connecting long distance parties to the conference circuit without seriously degrading the telephone connections due to possible circuit impedance mismatch.

When large conference circuits are desired, i.e. more than five conferees, the conference system generally requires a conversion from a two-wire transmission system to a four-wire transmission system (two wires for send signals and two wires for receive signals), so that amplification can be readily provided to make up for the system losses. With the four-wire transmission system, the conferees in the prior art were generally connected to a bridge circuit that provides means for summing the connections into a conference call. The bridge circuit, for example, can be a four-way or a six-way bridge having the capability for interconnecting four or six parties. Send and receive amplifiers are required to make up for the signal loss in the bridge. Furthermore, in order to maintain the quality of transmission in the conference circuit, the impedance of the bridge must be kept balanced. Without an impedance balance arrangement, as more conferees are added to the conference arrangement, as more conferees are added to the conference arrangement, there is a greater tendency for unbalance and thereby results in creating a greater amount of undesirable distortion, crosstalk, sidetone, and noise. Not only is it desirable to maintain the impedance of the bridge substantially constant, but the impedance presented or reflected to the line circuits of the conferees should also desirably remain substantially constant. This is of particular importance when connecting long distance parties to a conference connection wherein an impedance mismatch can seriously degrade the transmitted power and the quality of signal transmission. As the number of conferees are added into a conference circuit, the problems connected with impedance matching increases wherein the circuit balancing arrangement becomes more and more complex.

Large conference systems in the prior art include a stacking principle wherein several small and separate conference bridges are joined together to form a large common conference connection. An example of such a large conference circuit is described in an article entitled "Conference Arrangement For NORAD" by N. Lazo, printed in the July–Aug. 1964 issue of the "Bell Laboratory Record," pages 253–257. The problem with these types of systems is that as the number of bridge circuits that are stacked together increases, the loading upon the circuit further increases and the balancing arrangement becomes more difficult and expensive to control. Furthermore, the conference circuits of this type, are connected to certain junctors allotted for use in conference circuits only. This type of scheme is rather expensive since these junctor circuits are generally not available for other types of connections.

It is, therefore, an object of this invention to provide a new and improved conference circuit capable of interconnecting a large number of subscriber stations.

It is also an object of this invention to provide a new and improved conference circuit capable of connecting and disconnecting a large number of subscriber stations from a conference connection while maintaining the conference connection substantially balanced.

It is still a further object of this invention to provide a new and improved conference circuit for interconnecting a large number of subscriber stations without requiring the stacking of conference bridges.

It is still a further object of this invention to provide a new and improved conference circuit capable of interconnecting a large number of subscriber stations wherein each subscriber has full access to the conference circuits and that subscriber stations can be added or disconnected without affecting the remainder of the conference circuit.

It is still a further feature of the invention to provide a new and improved conference circuit capable of interconnecting a large number of subscriber stations to any of a plurality of conference connections that can be connected into common conference and subsequently disconnected without affecting the individual separate conference connections.

BRIEF DESCRIPTION OF THE INVENTION

The conference circuit of the invention includes a conference bridge having a plurality of input circuits and means for summing the signals applied to the input circuits at an output circuit. Access to the conference circuit is provided by a plurality of junctor circuits, each including at least one port for connection to a conferee's circuit and a four-wire port having a send circuit and a receive circuit. The send and receive circuits of the plurality of junctors are adapted to be connected to the conference bridge by a switching means so that any one of the send circuits are adapted to be connected to individual ones of the input circuits, and any of the receive circuits are adapted to be connected to the output circuits of the conference bridges. The switching means also includes a plurality of individual impedances that are separately connected to the input circuits and are disconnected when the connected input circuit is connected to a send circuit, so that the bridge remains essentially balanced as the number of conferees connected to the conference bridge changes.

A further feature of the invention includes a plurality of conference bridges and wherein the switching means is adapted to connect the receive and send circuits of each of said junctor circuits to any of the junctor circuit. Circuit means are also included for selectively interconnecting and disconnecting plural conference bridges through the switching means into common conference connections.

A further feature of the invention includes a sidetone suppression circuit between the send and receive circuits in each four-wire port for suppressing the port send signals received from a conference bridge.

THE DESCRIPTION OF THE PREFERRED EMBODIMENTS

Figure 1:
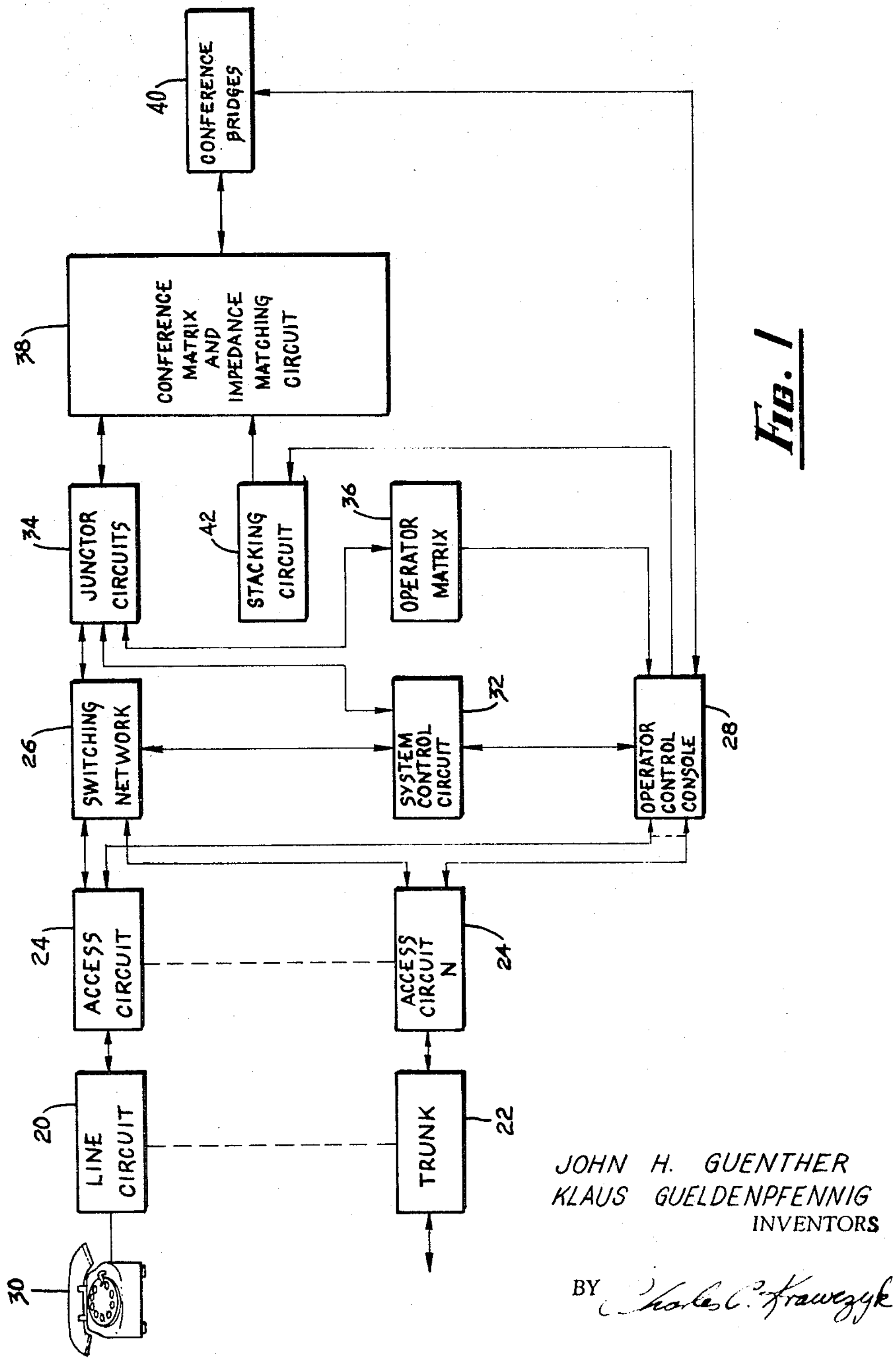
FIG. 1 is a block diagram of a semiautomatic operator controlled telephone system including the conference circuit of the invention.

The conference circuit of the invention is disclosed in FIG. 1 as a portion of a semiautomatic operator attended telephone system. However, it is to be understood that the conference circuit of the invention can be used with any type of switching system; manual, semiautomatic, or common control, modified to provide proper switching through the conference circuit matrix. The semiautomatic operator attended telephone system is more fully disclosed in a copending patent application entitled "Semiautomatic Operator Controlled Telephone System," Ser. No. 886,577, filed on Dec. 19, 1969, for Klaus Gueldenpfennig and Gerhard O. K. Schneider, and assigned to the assignee of the present invention.

The semiautomatic operator controlled telephone system includes a plurality of line circuits 20, and a plurality of trunk circuits 22, connected through separate access circuits 24 to the telephone switching network 26, and also connected to the operator control console 28. In response to an off hook condition in a telephone 30, or in response to an incoming call applied to a trunk 22, the access circuit signals the operator console for service. The operator, in response to the request, depresses a button on a control console, which, in turn, marks the access circuit requiring service and also initiates the system control circuit 32 to complete a connection from the marked line circuit to the operator's console.

The system control circuit first scans the junctor circuits 34 to locate and mark a free junctor circuit. Once a free junctor circuit is located, a link scan procedure is initiated to locate a free path between the marked access circuit and the marked junctor circuit. The link scanning, for example, can be accomplished by a path finding system described in a copending application entitled "Telephone Switching System," Ser. No. 782,078, filed on Dec. 9, 1968, for Klaus Gueldenpfennig, now Pat. No. 3,585,309, and assigned to the assignee of the present application. Once the free path is found, the access circuit 24 is connected via the switching network 26, one of the junctor circuits 34, and an operator's matrix 36 to the opertors's console 28.

If a two party call is to be made, the operator merely depresses the button corresponding to the called access circuit, and when the connections are completed and the called party answers, the operator is disconnected. On the other hand, if the calling party requests a conference circuit, the operator depresses a conference button which marks the connected junctor circuit 34 and also marks a selected one of a plurality of conference bridges 40. With the junctor circuit and the conference bridge marked, the interconnecting conference matrix and impedance matching circuit 38 connects the junctor circuit (and therefore the calling party), to the selected conference bridge. To complete the conference, the operator can now proceed to connect a second conferee to a bridge circuit in the same junctor circuit, and further conferees via other junctor circuits to the same conference bridge. With the conference circuit of the invention, any number of parties can be connected into a conference call, limited only in the number of available junctor circuits and background noise limitations. However, background noise can be further reduced with "push to talk" or voice control (VOX) telephones.

The conference circuit of the invention can establish a large number of separate conferences, limited only to the number of conference bridges 40 available. Furthermore, as will be explained in a later portion of the specification, separate conference calls can be interconnected into a common conference call via a stacking circuit 42, and later disconnected without requiring the disconnection and subsequent reconnection of the individual conference calls. With the conference circuit of the invention, several separate conferences can be independently established and can be connected into a common conference call, and subsequently disconnected, any number of times, while still maintaining the separate conference calls intact.

Figure 2:
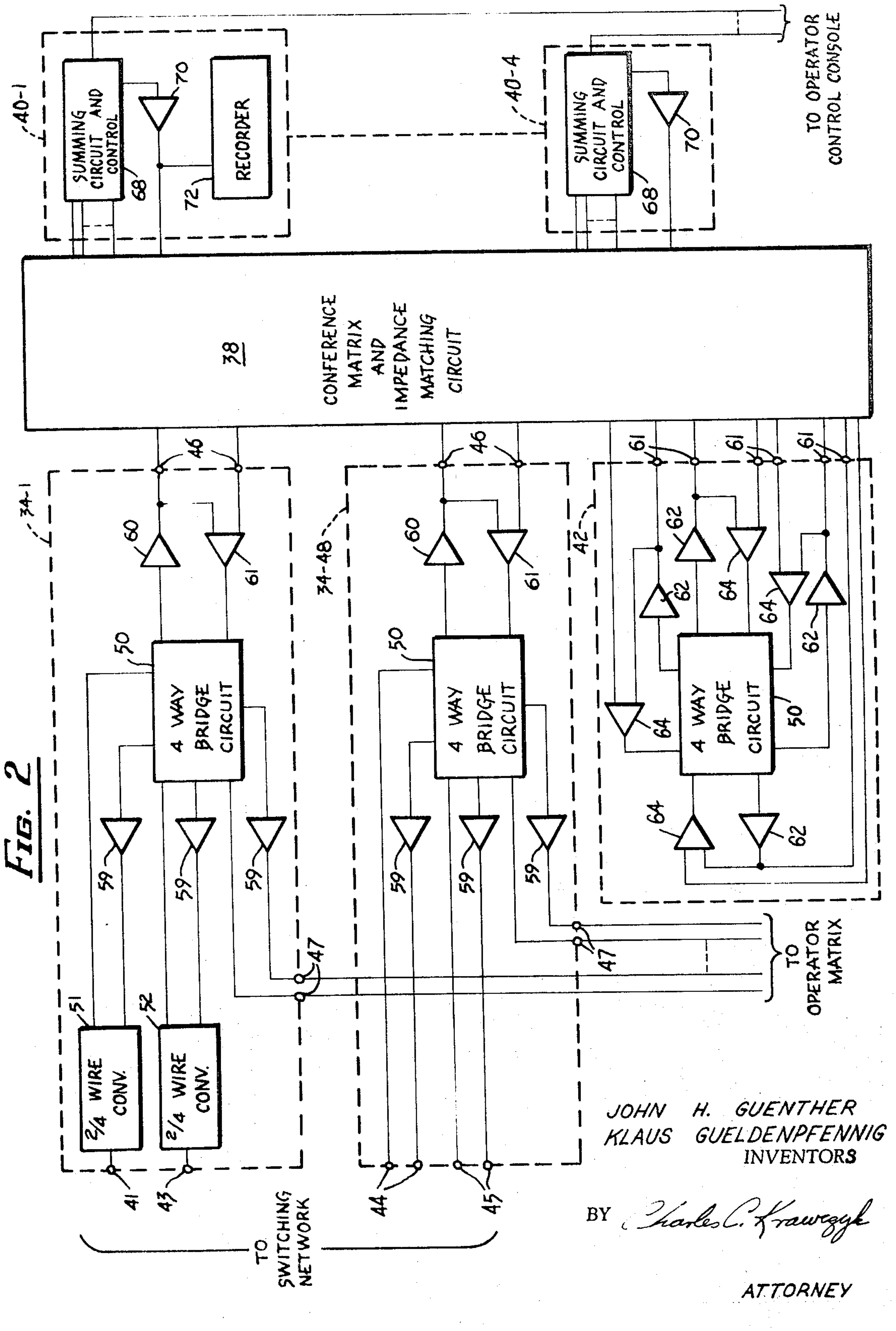
FIG. 2 includes an expanded block diagram of an embodiment of the conference circuit of the invention including four way bridge circuits.

The conference circuit of the invention is described in FIG. 2 as including 48 junctors 34–1–34–48, four conference bridges 40–1–40–4 and one stacking circuit 42. However, it is to be understood that the conference circuit of the invention can include any combination of such circuits depending upon the system requirements. With the specified number of junctor circuits, conference bridges, and stacking circuits, the conference matrix will include a 4 by 52 switching matrix so that any of the junctors 34–1–34–48, and the stacking circuit 42, can be connected to any of the conference bridges 40–1–40–4. A portion of the conference matrix and impedance-matching circuit is illustrated in greater detail in FIG. 4.

Figure 3:
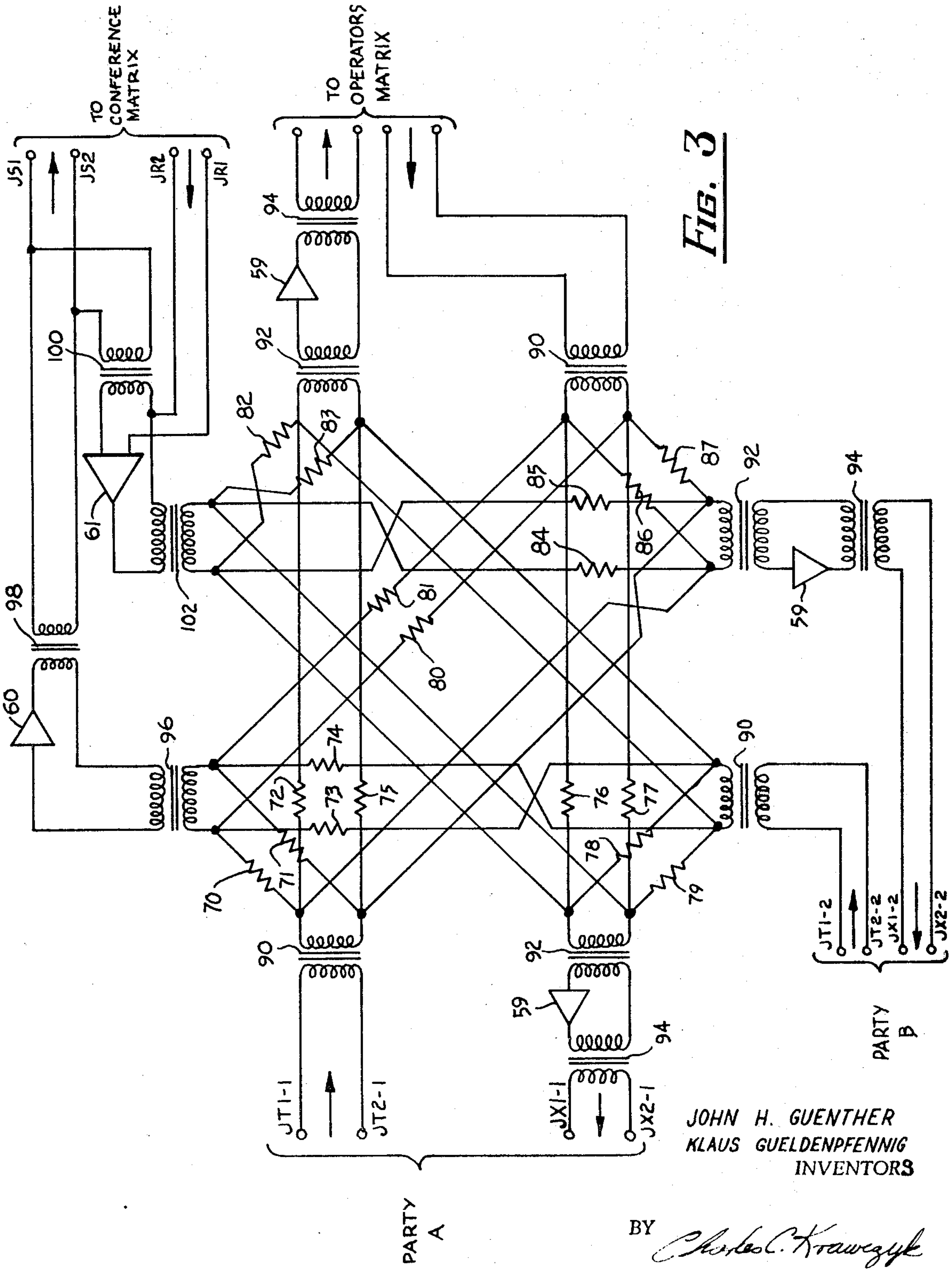
FIG. 3 is a schematic diagram of the transmission path through a junctor circuit including a four-way resistive bridge circuit.

Each of the junctor circuits 34–1–34–48 and the stacking circuit 42 include a four-wire, four way, bridge circuit 50 of the type illustrated in greater detail in FIG. 3. Each termination into and out of the junctor circuit will be designated a port, i.e. a two-wire port or a four-wire port. Each two-wire port functions as a two-way transmission pair. Each four-wire port consists of separate, one way, receive and send pairs. In junctor circuit 34–1, two of the four-wire connections to the junctor bridge circuits 50 are made to the two-to-four wire converter circuits 51 and 52, to convert from four-wire transmission to two-wire transmission for connection through the system switching network 26 via the two-wire ports 41 and 43. In junctor 34–48 two of the four-wire circuits from the bridge circuit 50 are connected to the switching network 26 via the four-wire ports 44 and 45 for a four-wire connection to the access circuit to provide a complete four-wire circuit switching system. The third four-wire connection in each junctor circuit is made to the operator matrix 38 via the four-wire port 47 while a fourth four-wire connection is made to the conference matrix 38 via the four-wire port 49.

Figures 7, 8:
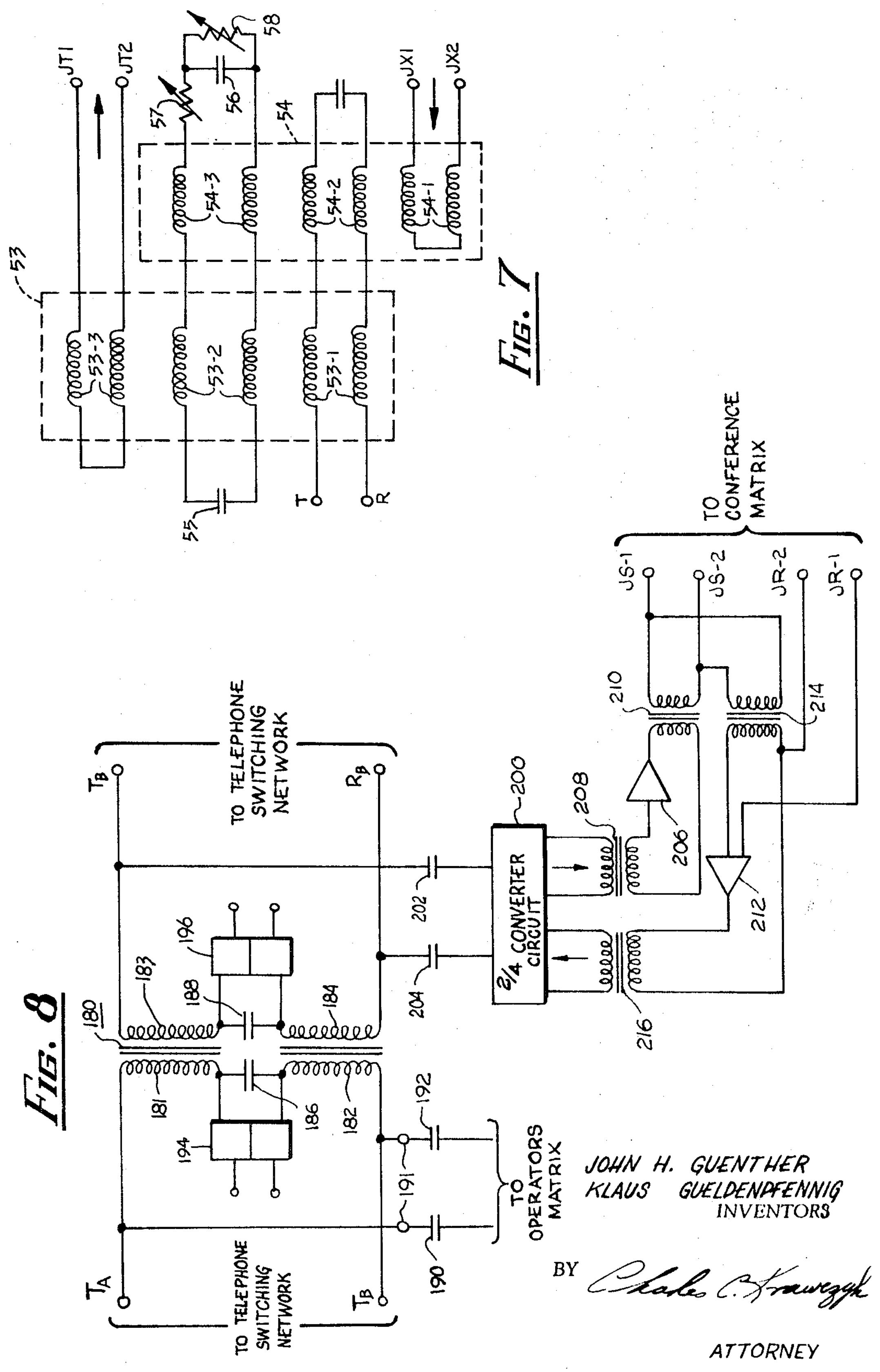
FIG. 7 is a schematic diagram of a two-to-four wire converter or hybrid circuit.
FIG. 8 is a schematic diagram of a portion of the conference circuit of the invention including the use of a standard transmission bridge for connection between two parties and the operator, and connection to a two-to-four wire converter circuit.

An example of a two-to-four wire converter or hybrid circuit is illustrated in FIG. 7. The two-wire connection from the switching network is made to the port terminals T and R (tip and ring). The converter circuit includes a first transformer 53 having three pairs of windings 53–1, 53–2 and 53–3, and a second transformer 54 having three pairs of windings 54–1, 54–2 and 51–3. The windings 53–2 and 54–3 are connected in a series circuit with the capacitors 55 and 56 and the resistors 57 and 58 for balancing the operation of the converter circuit. Signals for the two-wire line applied to, and received from, the windings 53–1 and 54–2. Signals are sent to the junctor bridge 50 from the windings 53–3. Signals received from the junctor bridge 50 are applied to the windings 54–1. This type of two-to-four wire converter circuit is well known in the art and does not need any further explanation.

Each of the send lines of the four-wire port connection to the converter circuits and the operator matrix include a sent amplifier 59 to compensate for the losses in the signal through the junctor bridge circuits 50. The fourth four-wire port connection, to the conference matrix 38, includes a send amplifier 60 and a receive amplifier 61. The send amplifier 60 compensates for the losses in the signal through the junctor bridge circuit 50. The receive amplifier 61 compensates for some of the losses in the signal in the conference matrix 38 and the connected conference bridge. A second signal is applied to another input of the receive amplifiers 61 from the output of its associated send amplifiers 60 to provide a 180° out-of-phase signal for sidetone suppression purposes.

In the stacking circuit 42, all four four-wire port connections 61 to the four way bridge circuit 50 are made to the conference matrix 38. Each of the connections include a send amplifier 62 and a receive amplifier 64. The amplifiers 64 are also connected to the amplifiers 62 to receive a 180° out-of-phase signal for sidetone suppression purposes.

The conference bridges 40–1–40–4 are connected to opposite side of the conference matrix so that the output from send amplifiers 60 in the junctors 34–1–34–48 (ports 46) and the outputs from all the send amplifiers 62 in the stacking circuit 42 (ports 61) can be connected to separate input circuits of any summing circuit 68 of any of the conference bridges. The summing circuits 68 are connected to apply the conference signals to a summing amplifier 70. The output of the summing amplifier 70 is connected to the conference matrix so that is can be connected to any junctor receive amplifier 61, and any stacking circuit receive amplifier 64. If desired, a recorder 72 can be connected to the output of the summing amplifier 70 to record the conversation in the conference call.

The four-way bridge circuit is illustrated in greater detail in FIG. 3 and includes a conventional, well known four way resistive bridge circuit including resistors 70–87 connected to provide four, separate, four-wire connections thereto. Three of the connections, party A, party B and operator, include a send transformer 90 and a receive transformer 92 to provide for an isolated balanced circuit configuration. The receive transformers 92 are coupled to the receive amplifiers 59, which in turn, include an output transformer 94 to maintain the balanced configuration. Another connection to the resistive bridge circuit includes a transformer 96 coupled to the send amplifier 60, which in turn, drives an output transformer 98. The secondary winding of transformer 98 is connected to the conference matrix (via terminals JS–1 and JS–2) for connection to the conference bridge summing circuits 68. The sidetone suppression connection to the receive amplifier 61 is made via a transformer 100. The receive signals from the summing amplifier 70 via the conference matrix are applied directly to the receive amplifiers 61 through terminals JR1 and JR2. The output of the receive amplifier 61 is connected to the four-way bridge circuit via a transformer 102 to maintain the balance circuit configuration. The arrangement is such that the send and the receive transmission paths are made through the four-way bridge circuit for transmission of individual conversations from two parties (party A and party B) and the operator to the conference bridge and the transmission of conference conversations from the conference bridge to the two parties and the operator. Although a four-way resistive bridge circuit is illustrated, it is to be understood that other type sizes of well known bridge circuits could be used as well.

The four-way bridge circuit 50 in the stacking circuit 42 includes the same resistive bridge circuit as illustrated in FIG. 3, however, having all of its send and receive connections made to the conference matrix 38. Each of the send and receive connections will include the amplifiers 60 and 61, and the transformers 96, 98, 100 and 102, interconnected as illustrated in FIG. 3.

Figure 6:
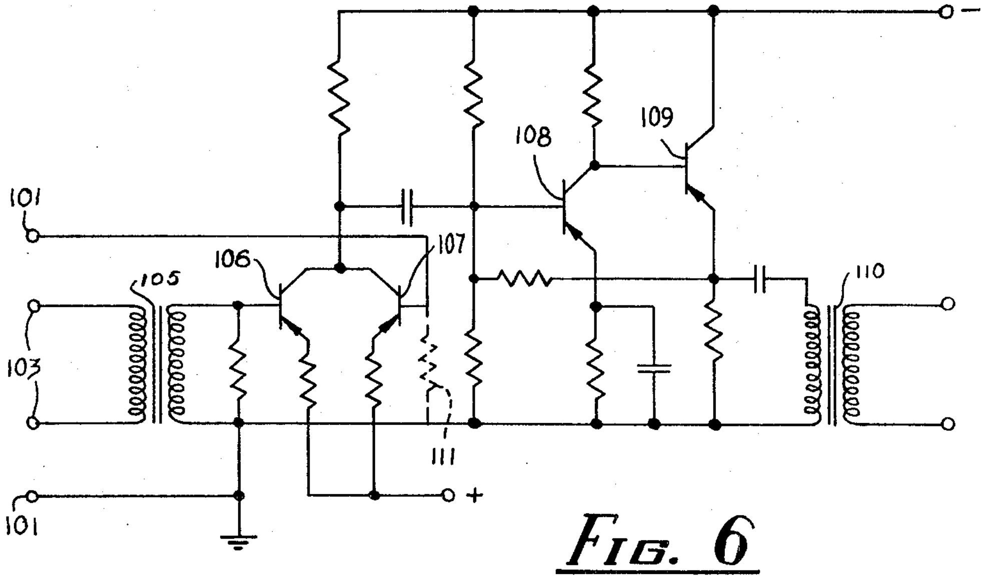
FIG. 6 is a schematic diagram of an amplifier circuit adapted for use as the send and receive amplifiers of FIGS. 2 and 3.

FIG. 6 illustrates an embodiment of am amplifier circuit for use as the send amplifiers 59, 60 and 62 and the receive amplifiers 61 and 64 of FIGS. 2 and 3. When used as a receive amplifier 61 and/or 64, its input transformer 105 corresponds to the transformer 100 of FIG. 3, wherein its primary winding terminals 103 are connected to the secondary winding of transformer 98. The signals from the conference bridge via the conference matrix are applied to the terminals 101. A pair of transistors 106 and 107 are connected as a differential amplifier, wherein the signals from the conference bridge are applied to the base of the transistor 107, and the sidetone suppression signals from the transformer 105 is applied to the base of the transistor 106. The arrangement is such that the signal from the transformer 105 is 180° out-of-phase with the send signal (that signal transmitted by the amplifier 60) and functions to suppress the sidetone signals received from a conference bridge corresponding to the parties and the operator connected to the same bridge circuit. The difference signals from differential amplifier is capacity coupled to the base of a transistor 108 connected as an amplifying stage, and which in turn, drives a transistor 109 connected as an emitter follower circuit. The output from the transistor 109 is applied to a transformer 110, which in turn, corresponds to the transformer 102 of FIG. 3. When the amplifier of FIG. 6 is to be used as the send amplifiers 59, 60 and 62, no signals are applied to the terminals 101 and a resistor 111 (illustrated with dashed lines) is added to the circuit to provide biasing for the transistor 107. In such case, the transformer 105 corresponds to the transformers 92 and 96 of FIG. 3, while the transformer 110 corresponds to transformers 94 and 98.

Figure 5:
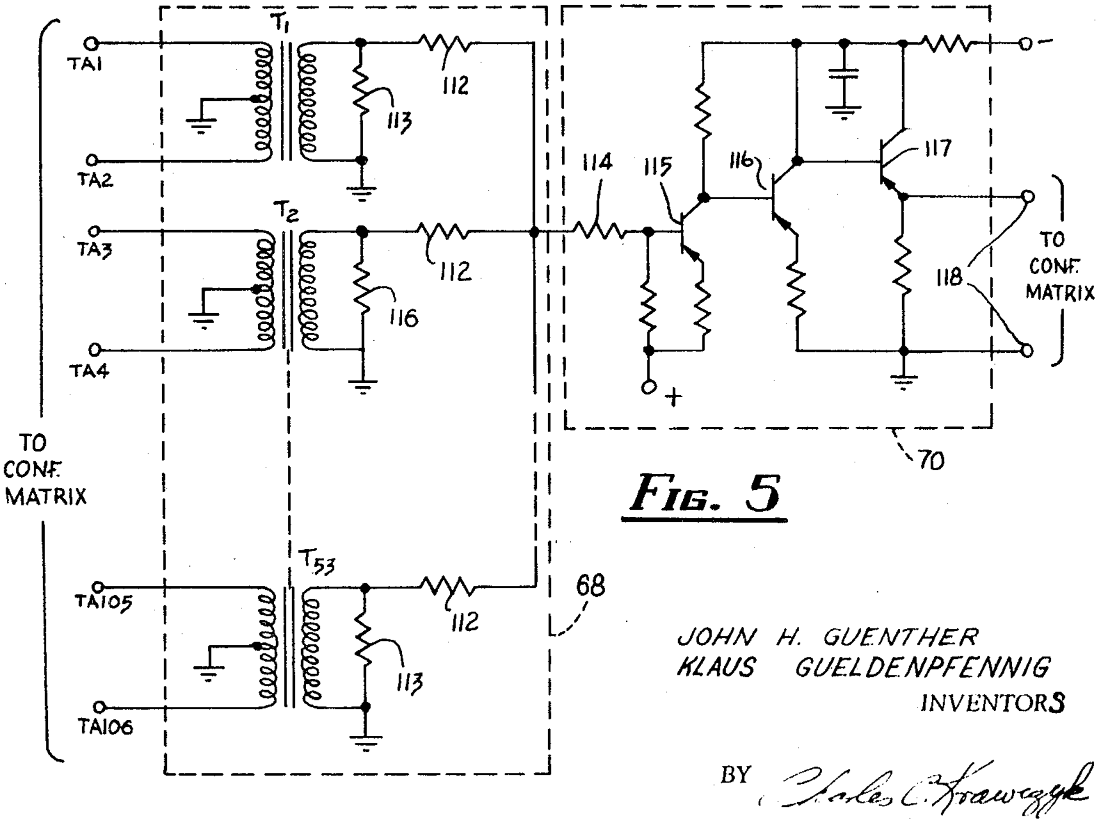
FIG. 5 is a schematic diagram of the conference bridges of FIGS. 1 and 2.

The conference bridge circuits 40–1–40–4 will now be explained by reference to FIG. 5. Each of the conference summing circuits 68 includes a plurality of 52 transformers T1–T53, each having their primary windings (input circuits) connected to the conference matrix 38 to receive signals from the junctor send amplifiers 60 and/or stacking circuit send amplifiers 62. The signals from the secondary windings of all of the transformers are summed together at the resistor 114 and applied to the conference bridge summing amplifier circuit 70 including a first transistor 115 connected as an amplifying stage, and two transistors 116 and 117 connected as successive emitter follower circuits to apply the summed conference signal to the conference bridge output circuit (terminal 118). The summing amplifier 70 makes up some of the loss in the conference summing circuits and provides a very low impedance output connection back through the conference matrix.

Figure 4:
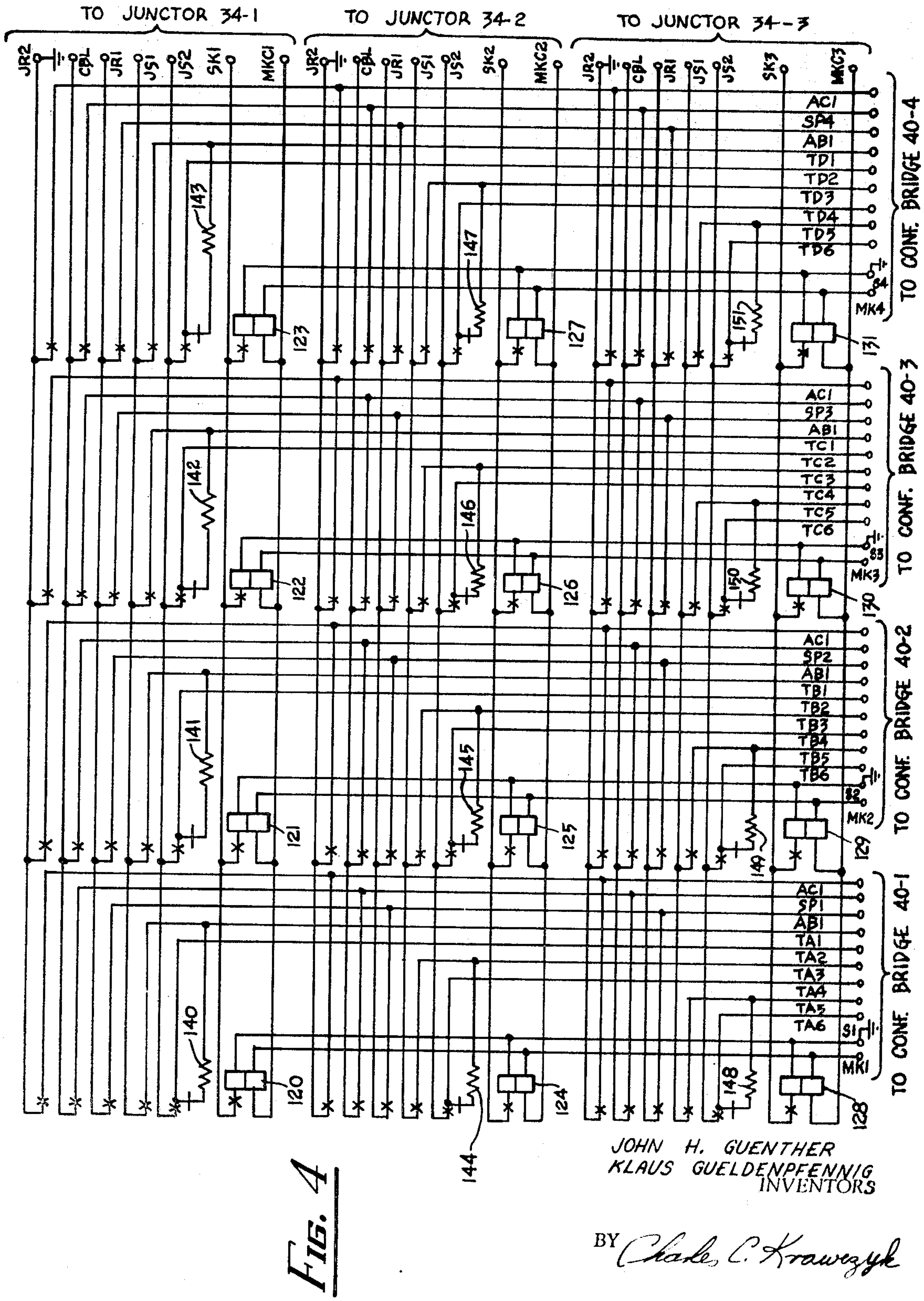
FIG. 4 is a schematic diagram of a portion of the conference matrix and impedance control circuit of FIGS. 1 and 2.

The purposes of simplifying the explanation, only a portion of the conference matrix and impedance matching circuit 38 is illustrated in FIG. 4, including 12 relays 120–131 connected in a 30 by 4 matrix configuration (three rows connected to junctors and four columns connected to conference bridges) designating the connections between three circuits 34–1–34–3 and any one of the four conference bridges 40–1–40–4. It should be noted that four horizontal relays will be added for each additional junctor circuit port and for each additional stacking circuit 42 port (each combination of send amplifier 62 and receive amplifier 64). In addition, two vertical conductors will be added for each additional junctor circuit and stacking circuit output. The terminals connected to the horizontal lines in the matrix are connected, as designated, to the junctor circuits 34–1–34–3, respectively. The terminals connected to the vertical lines are connected, as designated, to the conference bridges 40–1–40–4.

A pair of terminals designated JS1 and JS2 connected in each row of conductors are connected to the output circuit or send port (transformers 98) of the send amplifiers 60 in the designated junctor circuits. A pair of terminals JR1 and JR2 in each row are connected to the input circuits (receive port) of the receive amplifier 61 in the designated junctor circuits. The terminals designated MKC–1–MKC–3 are mark leads connected to the designated junctor circuits to receive a negative potential when the connected junctor circuits are marked for connection to a conference bridge. The mark potential is applied to the mark coils of the relays in the row corresponding to the marked junctor circuit. The terminals designated SK1–SK3 are connected to receive a negative hold potential when its connected junctor circuit is marked for a conference connection. The hold potential is applied to all the hold coils of the relays in the row corresponding to the marked junctor.

The bottom terminals designated MK1–MK4 are connected to the operator's console and are adapted to be grounded whenever a selected junctor circuit and/or stacking circuit port is to be connected to a designated conference bridge. The terminals designated S1–S4 apply ground to the other end of the hold coils of relays 120–131. For example, when the junctor circuit 34–3 is to be connected to the conference bridge 40–4, a negative mark potential is applied to the lead MKC3 and ground is applied to the lead MK4, and the relay 131 picks up to complete the connection. Simultaneously, a negative hold potential is applied from the junctor circuit to the terminal SK3 so that when the relay 131 picks up, the circuit for the hold coil is completed through one of the relay 131 contacts to keep the relay actuated after the mark potential has been removed, and for the duration of the conference connection.

The terminals along the bottom of FIG. 4 designated TA, TB, TC, TD, AB and AC are connected to various ones of the conference bridges 40–1–40–4, as designated. Pairs of terminals designated as TA, TB, TC and TD terminals are connected to separate input circuits of summing circuits (primary windings of transformers T1–T53) of the designated conference bridges. For example, terminals TA1 and TA2 are connected to the primary winding of transformer T1 in the conference bridge 40–1, the terminals TB1 and TB2 are connected to the primary winding of transformer T1 of the conference bridge 40—2, etc. In the case of 48 junctor circuits and one stacking circuit (as illustrated in FIG. 2), there would be 106 of each of the TA, TB, TC and TD terminals, one pair for each of the primary windings of the summing transformers T1–T53.

Pairs of the bottom terminals designated AB and AC are connected to the output circuit of the summing amplifier 70 (terminals 118 of FIG. 5) of the designated conference bridge circuits. For example, the terminals AB1 and AC1 are connected to the output of the summing amplifier 70 of the conference bridge 40–1, while the terminals AB2 and AC2 are connected to the output of the summing amplifier of the conference bridge 40–2, etc.

The arrangement is such, that any of the junctor circuits and/or any of the outputs of the stacking circuit can be connected to any conference bridge circuit. For example, assume relay 122 is actuated. In such case, the output circuit of the send amplifier 60 (FIG. 2) of the junctor circuit 43–1 will be connected (via terminals JS1 and JS2 and TC1 and TC2) to the transformer T1 of the summing circuit of the conference bridge 40–3, and the output circuit of the conference bridge summing amplifier 70 will be connected (via terminals AB3 and AC3 and JR1 and JR2 to the input of the receive amplifier 61 (FIG. 2) in the junctor circuit 34–1. The parties connected to the junctor circuit 34–2 can be added to the conference call by merely actuating the relay 126, the the parties connected to the junctor circuit 34–3 can be added to the same conference bridge by merely energizing relay 130. Hence, with 48 junctor circuits, each including two parties, a conference call can be established to include 96 parties by merely energizing the relays corresponding to the same conference bridge (a single matrix column).

The stacking circuit 42 allows various conference bridges 40–1–40–4 to be interconnected into common conference connections. As previously mentioned, each of the ports of the stacking circuit 42 are connected to a separate row of relay circuits in the matrix. If two existing conference calls are to be connected together, the operator merely actuates two matrix relays. The first matrix relay will connect one of the stacking circuit ports 61 to one of the conference bridges in use, while the other relay will connect another stacking circuit port 61 to the other conference bridge in use. If desired, all four conference bridges can be connected together into a single common conference via the stacking circuit by merely energizing four matrix relays. This arrangement has the advantage wherein once conference calls have been set up by the operator through the individual conference bridges, the separate conferences can be very simply joined together and disconnected by the operator without requiring that the original conference calls be disconnected and reconnected, as generally required in the prior art. Hence , in the example of a telephone negotiation session, the persons representing separate parties can be connected in separate conference calls including different conference bridges 40–1–40—4 so that they can converse between themselves in private, and then later be connected in a common single conference during the negotiations between the parties. The operator can assemble and disassemble the common conference circuit at the request of the parties.

A plurality of resistors 140–151 are connected in the conference matrix of FIG. 4 to provide an impedance-matching arrangement so that as various junctor circuits are added and removed to conference calls, the overall impedance applied to the conference bridges 40–1–40–4 remains substantially constant. The resistors 140–151 are connected through normally closed contacts of the relays 120–131, respectively, for connection across respective ones of the TA, TB, TC or TD terminals. For example, when the relay 130 is not actuated, the resistor 150 is connected across the terminals TC1 and TC2 thereby applying a load across the primary winding of the transformer T1 in the conference bridge 40–3. When the relay 130 is actuated, the resistor 150 is disconnected and the send amplifier in the junctor circuit 34–3 is connected across the primary winding of transformer T1 in its place. The value of the resistors 140–151 is selected to match the output impedance of the send amplifier 60 so that the summing transformers T1–T53 in the various conference bridges see a constant load applied thereto regardless of the number of junctors connected in any given conference circuit.

FIG. 8 illustrates a modification of the conference circuit of the invention wherein the four-way bridge circuit 50 of FIGS. 2 and 3 is eliminated and the operator and the parties are interconnected at the junctor circuit prior to the conversion from the two-to-four wire transmission system. The circuit of FIG. 8 includes a standard transformer-type transmission bridge including a transformer 180 having windings 181–184. The windings 181 and 182 are connected in a series circuit with a capacitor 186 across one two-way port including the terminals $T_a$ and $R_a$ that are connected to the telephone switching network 28. The windings 183 and 184 are connected in a series circuit with a capacitor 188 across another two-way port including terminals $T_b$ and $R_b$ also connected to the telephone switching network. A three two-way port 191 is connected via capacitors 190 and 192 to the operator's matrix. The signalling relays 194 and 196 are connected across the capacitors 186 and 188, respectively, to provide DC signalling through the transmission bridge. This type of transmission bridge is a standard well known type used in trunk circuits for interconnecting a transmission path between two parties.

The conference circuit includes a two-to-four wire converter circuit 200 connected to terminals $R_b$ and $R_b$ of the transmission bridge via the capacitors 202 and 204. The terminals JS–1, JS–2, JR–1 and JR–2 form a four-wire port for connection to the conference matrix 38. The send output from the converter circuit 200 is coupled to a send amplifier 206 via a transformer 208. The output of the send amplifier 206 is coupled by a transformer 210 to the terminals JS–1 and JS–2 for connection to the conference matrix. Input signals from the conference matrix are applied directly to a receive amplifier 212 via terminals JR–2 and JR–1 and sidetone suppression signals are applied to the amplifier 212 via a transformer 214. The output of the amplifier 212 is applied through a transformer 216 to the receive terminals of the two-to-four converter circuit 200. The amplifiers 206 and 212, the signals received and transmitted by these amplifiers, and the sidetone coupling through transformer 212 are the same as previously set forth with regards to the amplifiers 60 and 61 of FIGS. 2, 3 and 6.

FIG. 8 illustrates that the conference circuit of the invention can be connected to any two-wire telephone switching network by merely capacity coupling the converter circuit 200 to any junctor circuit transmission bridge. However, the advantage in the four-way bridge circuits of FIGS. 2 and 3 is that a four-wire transmission system is available, if desired, that can be extended through the telephone switching system by merely eliminating the two-to-four wire converter circuits 51 and 52 (such as in junctor 34–48, FIG. 2) and provide four-wire switching through the switching network 26 of FIG. 1 to the access circuits 24. This is advantageous in the case wherein the access circuits are connected to other types of communication networks, such as for example, two four-wire trunks, FM radio trunks, single sideband radio trunks, etc.

Figure 9:
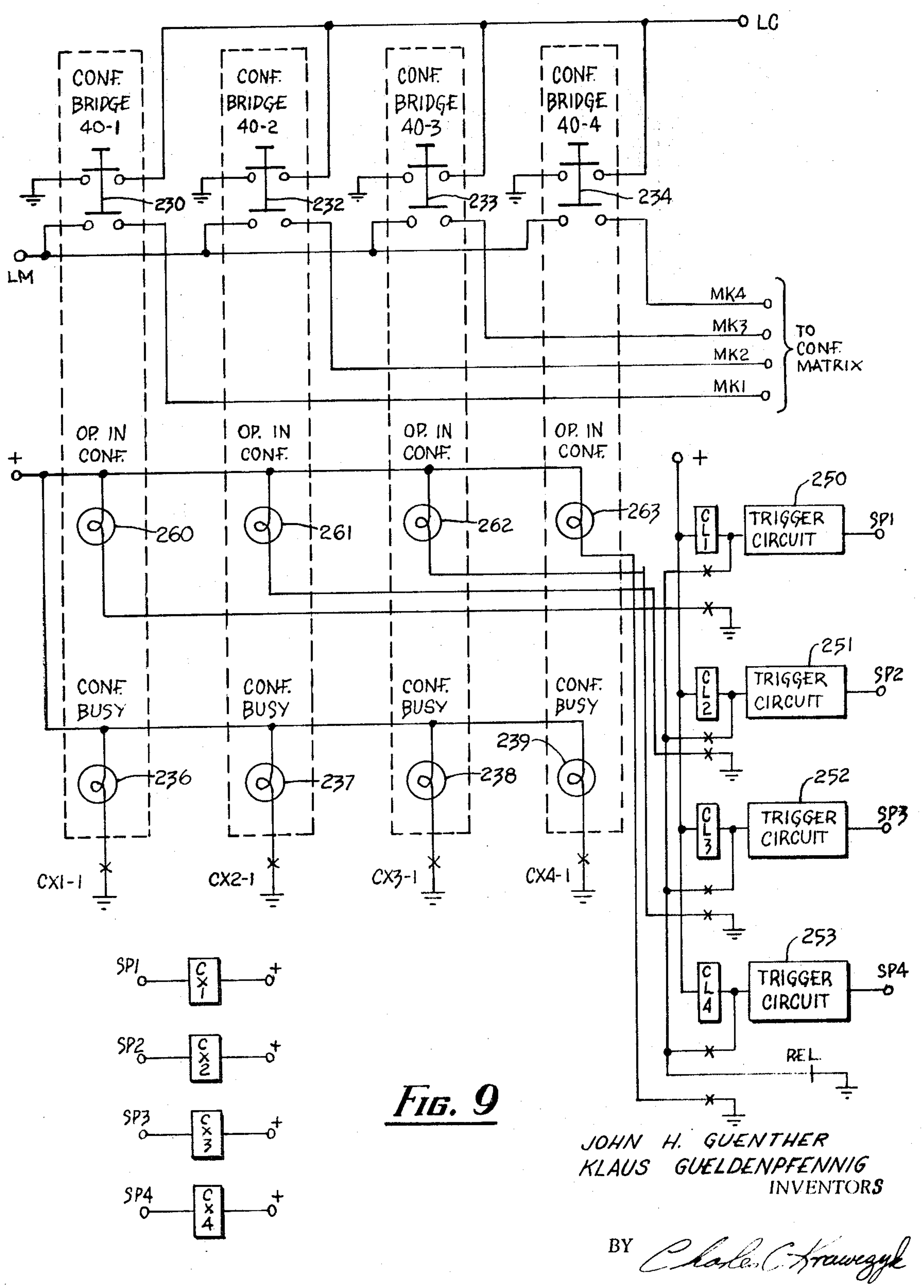
FIG. 9 is a schematic diagram of a control circuit in the operator's console for use in selecting conference bridges to be connected and including lamp circuits for indicating the status of the conference bridges.

FIG. 9 includes a schematic diagram illustrating the control buttons and lamp signalling at the operation console used for setting up, and indicating the status of, various conference circuits. A separate pushbutton 230–234 is provided for gaining access to the conference bridges 40–1–40–4, respectively, and for connecting the conference bridges to selected junctor circuits. As previously mentioned, in the semiautomatic operator attended telephone system of FIG. 1, the operator is connected to the junctor of a party requesting service. If the party requests a conference call, the operator will first observe the conference busy lights 236–239 (corresponding to conference bridges 40–1–40–4, respectively) to observe the busy-free status of the conference bridges. If a conference bridge is free, its corresponding light will not be illuminated. The operator depresses a button corresponding to a free conference bridge to complete the conference connection.

One contact of each set of contacts of each of the pushbuttons 230–234 is connected to the terminal LC, which in turn, is connected to the system control circuit. When any one of the pushbuttons are depressed, a request is made via terminal LC for access to the system control circuit 32. When access is granted from the system control circuit, power is applied to the terminal LM, which is connected to one contact of a second set of contacts of each of the pushbuttons 230–234. The opposite contact from the second set of contacts of the switches 230–234 are connected to separate terminals MK1–MK4, respectively, which in turn, are connected to one end of the mark coils in the conference matrix as illustrated in FIG. 4. The other end of the mark coils of the relays of FIG. 4 are connected to the contacts MKC1–MKC3, which in turn, are connected to mark circuit in the junctor circuits 34–1–34–3.

As previously mentioned, the operator is already connected to the junctor circuit to be connected to the conference circuit, and hence, the junctor is marked and ground is applied to the corresponding one of the MKC leads. At the same time the junctor is marked, power is applied to the corresponding sleeve terminal SK. Therefore, when the operator depresses one of the conference pushbuttons 230–234, power is applied to one of the terminals MK of the selected conference bridge. Since a mark ground was previously applied to a MKC terminal from the junctor, the connected matrix relay picks up. When the relay picks up, the circuit is complete for the hold coil to maintain the matrix relay actuated after the mark circuit has been released and the marking signals removed. If the operator is connected to junctor 34–1, and therefore ground is applied to the terminal MKC1 and power is applied to the sleeve contact SK1, when the operator depresses button 230, the mark coil of relay 120 is energized and the relay picks up. The circuit for the hold coil is completed through a normally open set of contacts of relay 120 so that power from the terminal SK1 will be applied via the hold coil to the grounded terminal S1. The ground from the MKC1 terminal is now removed since the marking operation is complete and the connection through the matrix is held actuated by the hold coil.

When a matrix relay is actuated, the transmission path of the junctor circuit is connected to a conference bridge. In addition, a ground signal is applied from the junctor circuits via a terminal CBL through the actuated contacts of the matrix relay to one of the corresponding terminals SP1–SP4. Terminals SP1–SP4 are connected to the relays CX1–CX4, respectively, (FIG. 9). Contacts of the relays CX1–CX4 are connected in series with the conference busy lamps 236–239, respectively, so that when one of the relays is actuated, its connected busy light is energized. The contacts SP1–SP4 are also connected to the relays CL1–CL4 through trigger circuits 250–253, respectively. The other end of the relays CL1–CL2 are connected to a power terminal. The arrangement is such that when one of the matrix relays is actuated, ground is applied to a corresponding one of the terminals SP1–SP4, and the connected trigger circuit applies a ground pulse of sufficient duration to pick up its connected relay. A normally open contact of each one of the relays CL1–CL4 is connected between the trigger circuits 250–253 and relays CL1–CL4, respectively, and ground, through normally closed contacts REL thereby providing a latching circuit for the relays. Another set of normally open contacts of each of the relays CL1–CL4 is connected to separate ones of the lights 260–263, respectively, to energize the lights to indicate to which of the conference bridges the operator is connected.

Assume that the operator was connected to the junctor 34–1, the conference bridge 401 1 was selected by depressing the pushbutton 230 and the relay 120 was actuated, the relay CX1 will pick up to energize the conference busy line 236 and relay CL1 will pick up to energize lamp 260 to indicate that the operator is connected to the conference bridge 40–1. Once the connection to the conference circuit has been completed, the operator depresses a release button on its console and the REL contacts open, releasing the latching circuit to CL1 and deenergizing the lamp 260. However, since the junctor 34–1 is still connected to the conference bridge, the relay CX1 will be continued to be activated and the lamp 236 will continue to be energized indicating a busy condition of the conference bridge.

The operator will now proceed to connect the other parties to the same conference bridge by first entering another junctor circuit (for example, junctor 34–2) and ring up the next conferee. When the conferee answer, the operator will again depress pushbutton 230 and the matrix relay 124 (FIG. 4) will pick up and connect the junctor 34–2 to the conference bridge 40–1. The CL1 relay will again be latched and the light 260 will be energized to designate that the operator and the junctor 34–2 has been connected to the conference bridge 40–1. The operator will again depress its release button and the operator will be disconnected from the junctor and the CL1 relay is deactivated. The procedure will be repeated until all desired parties are connected into the conference. As previously mentioned, since each junctor circuit includes provisions for interconnecting two parties and also includes provisions for connection to the conference circuit, the operator can alternatively complete the connection between two conferees through a junctor circuit and then, subsequently, connect the junctor circuit to the conference bridge. Alternatively, the operator can connect a single partly to a junctor circuit, connect the junctor to the conference bridge, and then, subsequently, add another conferee to the same junctor.

The conference circuit of the invention is a very flexible system wherein it has the capability of connecting a large or a small number of conferees into a conference connection. For example, with the 48 junctor circuits and with two conferee ports per junctor circuit, as many as 98 conferees can be added to a single conference bridge. It should be noted, that each conferee has complete access to the conference bridge and can be added to, or removed from, the conference connection without disturbing the connection of the other conferees.

There is no need to keep a long written list to identify the certain subscribers connected cited to certain conference connections. The operator has access to the transmission path in each junctor circuit so that the operator can readily identify the conference circuit to which a party is connected by merely connecting itself to the same junctor circuit. Therefore, if a calling party desires to be connected to the same conference circuit to which a certain subscriber is connected, the operator can merely connect itself to the subscribers's junctor and thereby identify the conference bridge and request whether or not the party should be added, and if approved, proceed to connect the calling party to the same conference bridge.

Furthermore, the various conference connections can be interconnected together in various combinations of common conferences and, subsequently, separate without disrupting or disconnecting the individual separate conference connections.

The conference circuit of the invention maintains a complete balance arrangement between the conferee's ports and the conference bridges. The output impedance of the amplifiers are selected to have a very low impedance. The input impedances of the amplifier are selected to provide impedance match and therefore provide proper power transfer through the conference connections. The balanced arrangement also allows the interconnecting wires to be twisted pairs, which in turn, function to reduce crosstalk. The conference circuit of the invention also provides excellent transmission characteristics wherein as much as 50 db. of sidetone suppression had been observed. Furthermore, the impedance presented to a conferee by the conferee ports of the conference circuit of the invention, is uniform and of the proper magnitude (600 ohms), thereby providing proper termination for local and long distance subscribers.

In addition, a four-wire switching arrangement, if desired, can be extended throughout the telephone switching network to provide access to the conference bridges to four-wire trunk circuits, and various other types of communication systems, such as for example, FM radios and single sideband systems.

What is claimed is:

1. A telephone conference circuit comprising:

a plurality of conference bridges, each bridge including a plurality of input circuits for receiving a plurality of separate conference signals, and including summing circuit means, having an output circuit, for summing the conference signals;

a plurality of junctor circuits, each junctor circuit having a signal transmission circuit including at least one conferee port for sending signals to, and receiving signals from, a conferee's circuit, and a conference port for connection to said conference bridges, said conference port including a send circuit and a receive circuit, and switching means for selectively connecting any of said junctor conference ports to any of said plurality of conference bridges, wherein separate junctor send circuits can connect to separate conference bridge input circuits and wherein said conference bridge output circuits can connect to the receive circuits of corresponding junctor circuits, said switching means includes means for connecting separate impedances across individual ones of the conference bridge input circuits and for disconnecting the impedances when the conference bridge input circuits are connected to the send circuits so that the conference bridge remains essentially balanced as the number of conferees connected to the conference bridges changes.

2. A telephone conference circuit as defined in claim 1 including:

means for selectively interconnecting any of said plurality of conference bridges into common conference connections.

3. A circuit for connecting a plurality of conferees in a conference connection comprising:

a conference bridge including a plurality of input circuits for receiving a plurality of separate conference signals and including a summing circuit, having an output circuit, for summing the conference signals;

a plurality of junctor circuits, each junctor circuit including at least one conferee port for connection to a conferee's circuit and including a conference port having a send circuit and a receive circuit, and switching means for selectively connecting any ones of said junctor circuits to said conference bridge, wherein said send circuits of said junctor conference ports can be connected to separate ones of said conference bridge input circuits and wherein said conference bridge output circuit can be connected to the receive circuits of the connected junctor conference ports, said switching means includes means for connecting separate impedances across said plurality of conferences bridge input circuits and for disconnecting individual ones of said impedances when connecting said send circuit to the conference bridge input circuits so that the load applied to said conference bridge input circuits remains substantially constant as the member of junctor circuits connected to the conference bridge changes.

4. A conference circuit comprising:

a plurality of four-wire bridge circuits, each including a plurality of four-wire ports, each port including a send circuit and a receive circuit;

a plurality of conference bridges, each conference bridge including a plurality of input circuits and means for summing the signals received at said input circuits at an an output circuit;

a matrix circuit for connecting one of the four-wire ports of any of said bridge circuits to any of said conference bridges, wherein the send circuits can connect to the conference bridge input circuits and wherein the receive circuits can connect to the output circuits of corresponding conference bridges, and impedance-matching means in said matrix circuit for connecting separate impedances to said conference bridge input circuits and for disconnecting the impedances connected to the input circuits when connecting send circuits thereto so that the load on said conference input circuits remains substantially constant as the bridge send circuits are connected to, and disconnected from, said conference bridges.

5. A conference circuit as defined in claim 4 wherein: at least two of said four-wire ports in one of said four-wire bridges is connected to said matrix circuit so that the send circuits of said ports can connect to input circuits of any conference bridges and the receive circuits of said ports can connect to the output circuits of corresponding bridge circuits, wherein said bridge circuit, when connected to different conference bridges, functions to interconnect the conference bridges into a common conference connection.

6. A conference circuit as defined in claim 4 including:

circuit means for connecting a sidetone suppression circuit between the send and receive circuits of the ports connected to said matrix circuit.

7. A conference circuit as defined in claim 6 wherein:

said send and receive circuits of the ports connected to said matrix circuit include send and receive amplifiers, respectively, and said sidetone suppressing circuit means couples the output signal from the send amplifiers to the input of the receive amplifiers in the same port, in a direction to suppress the signals of said send amplifier received by said receive amplifier from a connected conference bridge circuit.

8. A conference circuit as defined in claim 4 wherein:

the input circuits of said conference bridges include a plurality of transformers, the primary windings of which are connected to the matrix circuit for connection to said send circuits, and wherein the secondary winds of the transformers are coupled to an amplifier which sums the signals from the transformers to produce conference signals at said output circuit.

9. The conference circuit as defined in claim 8 wherein:

said four-wire bridge circuits comprise a four-way resistive bridge providing three four-wire ports for receiving signals from, and sending to conferee's and operator's circuits and a four-wire output port connected to said matrix circuit for sending signals to, and receiving signals from, a conference bridge circuit when connected thereto.

10. A conference circuit comprising:

a conference bridge circuit, including a plurality of input circuits and means for summing the signals received at said input circuits at an output circuit;

a plurality of two-to-four wire converter circuits, each including a two-wire port for receiving signals from, and sending signals to, a conferee circuit, and a four-wire port including a send circuit, and a receive circuit;

switching means for selectively connecting any one of said converter circuits to said conference bridge, wherein said send circuits of said converter circuits to said conference bridge, wherein said send circuits of said converter circuits connect to separate ones of said conference input circuits, and wherein said conference bridge output circuits connect to the receive circuits of the corresponding converter circuits, and said switching means includes means for connecting separate impedances across said plurality of conference bridge input circuits and for disconnecting the impedances when connecting any of said send circuits to the conference bridge input circuits so that the load applied to said bridge input circuits remain substantially constant as to the number of junctor circuits connected to the conference bridge changes.

11. A conference bridge circuit as defined in claim 10 wherein:

said send and receive circuits of said converter circuit includes send and receive amplifiers, respectively, and circuit means for connecting a sidetone suppression circuit between said send amplifier circuit and said receive amplifier circuit in each four-wire port.

12. A conference circuit comprising:

a plurality of conference bridges, each conference bridge includes a plurality of input circuits and means for summing the signals received at an output circuit;

a plurality of two-to-four wire converter circuits, each converter circuit includes a two-wire port for connection to conferee's circuits and a four-wire port including a send circuit and a receive circuit;

a matrix circuit for selectively connecting any one of the converters to any one of said conference bridges, wherein the send circuits connect to conference bridge input circuits and wherein the receive circuits connect to corresponding conference bridge output circuits;

impedance-matching means in said matrix circuit for connecting separate impedances to said conference bridge input circuits and disconnecting the impedances connected to input circuits when connecting send circuits thereto so that the load on said conference input circuits remains substantially constant as the bridge send circuits are connected to, and disconnected from, said conference bridges.

13. A conference circuit as defined in claim 12 including:

a bridge circuit including at least two four-wire ports having send and receive circuits, and circuit means for connecting the send and receive circuits of said bridge circuit to said matrix circuit so that the bridge circuit can be connected to any of said plurality of conference bridges, wherein the bridge send circuits connect to conference bridge input circuits and wherein the bridge receive circuits connect to corresponding conference bridge output circuits, thereby interconnecting any of said conference bridges.

14. A conference circuit as defined in claim 13 including:

said send and receive circuits of said converter and bridge circuits includes send and receive amplifiers, respectively, and circuit means for connecting a sidetone suppression circuit between the send amplifier circuit and the receive amplifier circuit in each four-wire ports of the converter and bridge circuits.

* * * * *